United States Patent [19]

Loeffler

[11] Patent Number: 4,796,741
[45] Date of Patent: Jan. 10, 1989

[54] SYNCHRONIZER BLOCKER PIN MOUNTING STRUCTURE

[75] Inventor: John M. Loeffler, Toledo, Ohio
[73] Assignee: Dana Corporation, Toledo, Ohio
[21] Appl. No.: 131,559
[22] Filed: Dec. 11, 1987
[51] Int. Cl.⁴ .............................................. F16D 23/08
[52] U.S. Cl. ................................ 192/53 E; 192/53 R; 403/378
[58] Field of Search ............... 192/53 E, 53 F, 53 R; 403/324, 378, 379, 306; 285/404

[56] References Cited

U.S. PATENT DOCUMENTS

| | | |
|---|---|---|
| 1,716,888 | 6/1929 | Griffith . |
| 2,052,394 | 8/1936 | Fullman .................... 285/404 |
| 2,087,070 | 7/1937 | Reggio ..................... 192/53 F |
| 3,078,975 | 2/1963 | Eaton . |
| 3,286,801 | 11/1966 | Wojcikowski ............. 192/53 F |
| 3,367,686 | 2/1968 | Kurz . |
| 3,695,403 | 10/1972 | Eastwood ................... 192/53 E |
| 3,806,267 | 4/1974 | Vining Jr. .................. 403/379 |
| 3,910,390 | 10/1975 | Eichinger .................. 192/53 E |
| 4,162,001 | 7/1979 | Yant ......................... 192/53 E |
| 4,372,703 | 2/1983 | Szostak ..................... 403/378 |
| 4,579,477 | 4/1986 | Hartman ................... 403/324 |

FOREIGN PATENT DOCUMENTS 464102 4/1937 United Kingdom .............. 192/53 F

Primary Examiner—Leslie A. Braun
Assistant Examiner—David A. Testardi
Attorney, Agent, or Firm—Harold D. Shall

[57] ABSTRACT

A synchronizer assembly having a clutch collar disposed between axially spaced friction rings. Blocker pins are mounted by a cylindrical shoulder at one end thereof into cylindrical bores formed in the friction ring. The cylindrical shoulder is the same diameter of at least the portion of the blocker pin immediately outwardly of the friction ring. The cylindrical bore in the friction ring and the cylindrical shoulder of the blocker pin received therein have registering grooves formed therein and a locking pin is pressed into the registering grooves to lock the blocker pin to the friction ring.

10 Claims, 2 Drawing Sheets

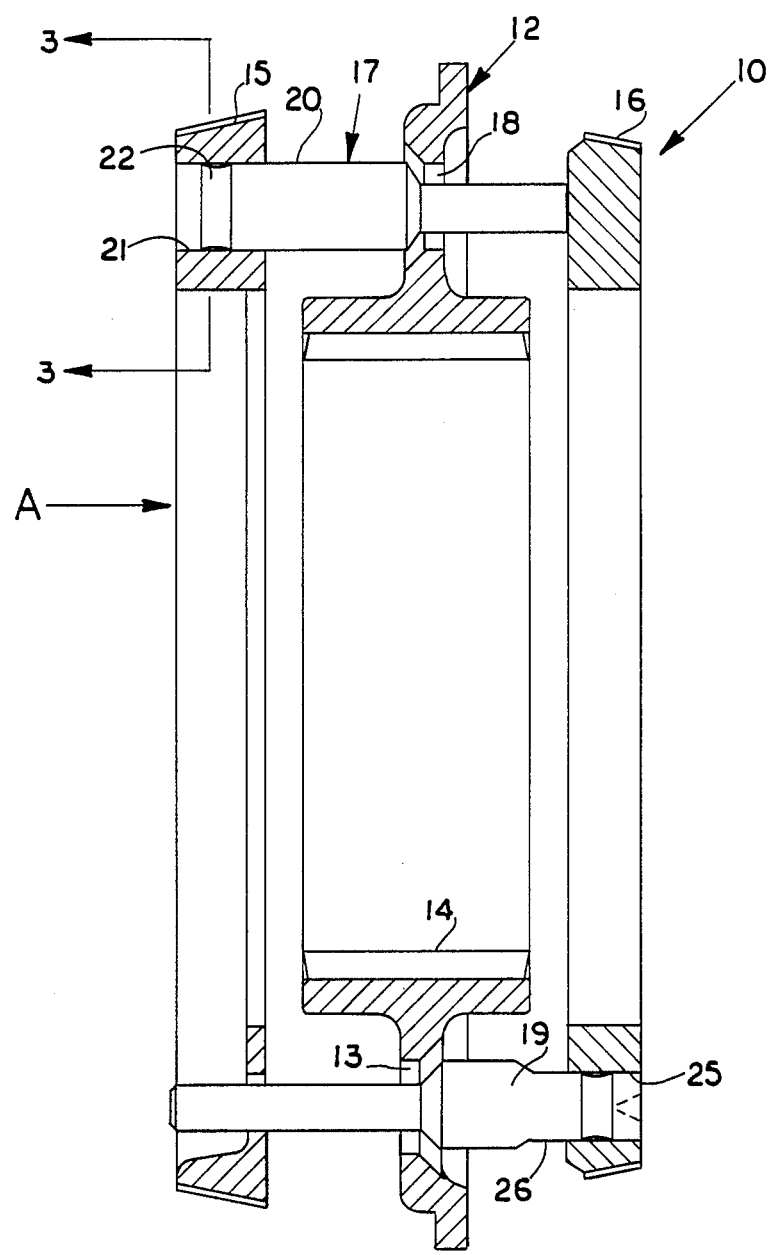
FIG_1

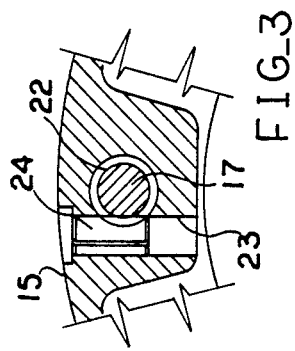
FIG_3
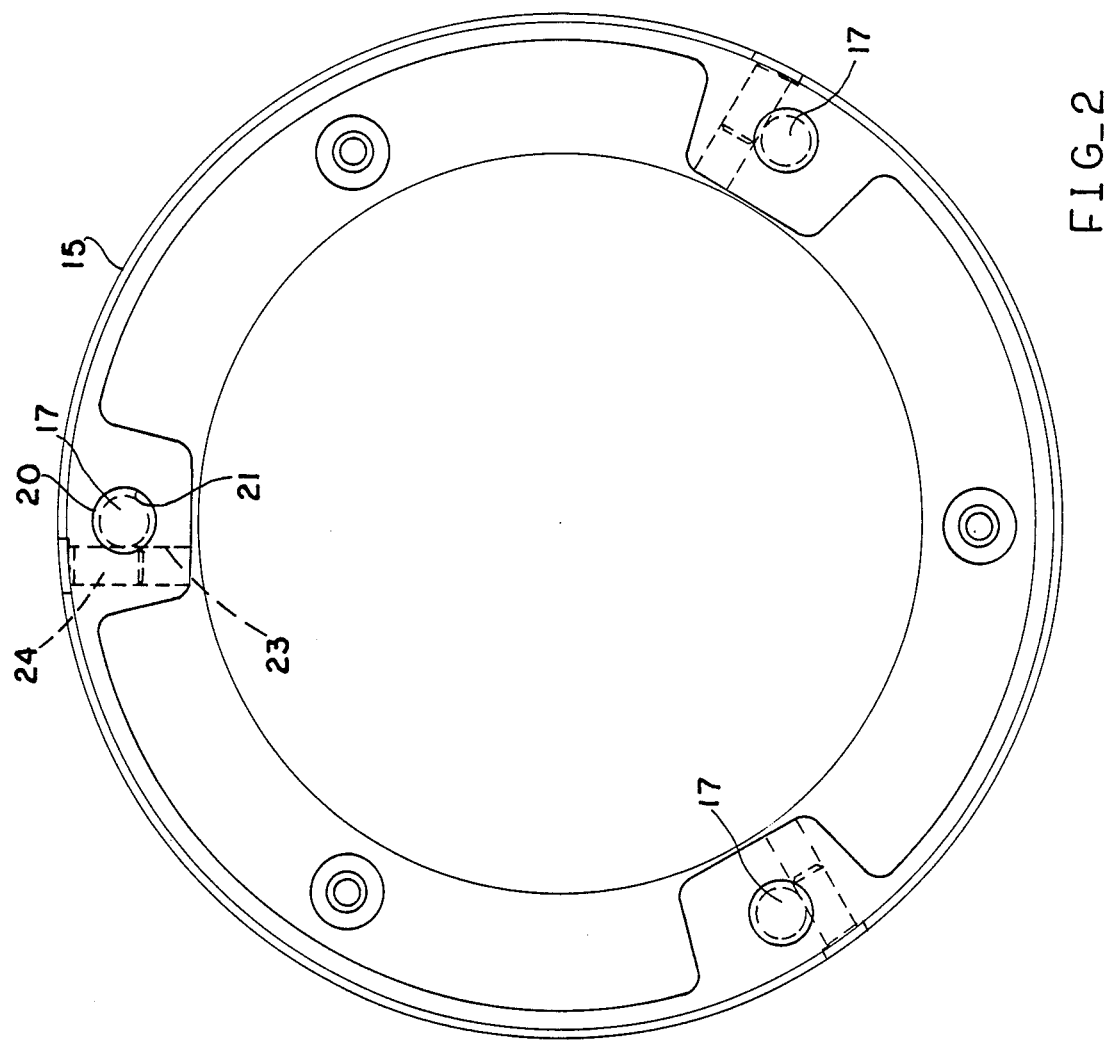
FIG_2

SYNCHRONIZER BLOCKER PIN MOUNTING STRUCTURE

BACKGROUND AND SUMMARY OF THE INVENTION

This invention relates to synchronizers in general and more particularly to the structure for mounting the synchronizer blocker pins to the synchronizer friction ring of the synchronizer.

The conventional method most widely used involves providing the blocker pin with a shoulder that rests against an outer end surface of the friction ring and with a reduced diameter portion passing through a hole in the ring and the outer end of the reduced diameter portion being peened or riveted in place.

The present embodiment of this invention involves a synchronizer blocker pin wherein the cylindrical shoulder outside of the synchronizer friction ring and the cylindrical shoulder pressed into the friction ring are of the same diameter; the latter not being of a reduced diameter, thus providing strength for the blocker pin at the location wherein it enters the ring. The blocker pin is retained in place in the bore of the ring in which it is received by a chordally extending pin which is passed through registering chordally openings extending through the pressed in shoulder of the blocker pin and the bore in the ring receiving the blocker pin; the chordally extending openings lying in a plane at right angles to the axis of the blocker pin and bore.

BRIEF DESCRIPTION OF THE DRAWINGS

FIG. 1 is a longitudinal sectional view of a synchronizer assembly incorporating this invention with the blocker pins shown in full lines;

FIG. 2 is an end view of the left hand friction ring of FIG. 1 when viewed in the direction of the arrow A in FIG. 1; and FIG. 3 is a cross sectional view taken along the lines 3—3 in FIG. 1 to show a typical blocker pin mounting structure.

DESCRIPTION OF A PREFERRED EMBODIMENT

Referring to FIG. 1, a synchronizer assembly 10, includes a clutch collar 12 therein. The collar 12 has a splined bore 14 which is conventionally splined onto a shaft (not shown).

The assembly 10 also includes a left and right hand friction ring 15 and 16, respectively, which friction rings are adapted to be conventionally shifted into frictional engagement with gears (not shown) to bring the latter into synchronization with the haft (not shown) and to allow the collar 12 to be clutched between the selected gear and the shaft by the splines 14.

Means are provided to drivingly connect the left and right hand friction rings 15 and 16 to the collar 12 for unitary rotation and relative axial movement. More particularly, the left friction ring 15 has three blocker pins 17 secured thereto which blocker pins extend to the right therefrom to conventionally pass though registering openings, one of which is shown at 18, in the collar 12 while the right ring 16 has three blocker pins, one of which is shown at 19, which blocker pins extend to the left therefrom to conventionally pass through registering openings, one of which is shown at 13.

The blocker pins 17 and 19 are secured to the friction rings 15 and 16 respectively. Referring to FIGS. 1, 2 and 3 and the blocker pin indicated by the numeral 17 as illustrative of such securement, the blocker pin has a cylindrical shoulder 20 which is of uniform diameter and is pressed fit into a registering cylindrical bore 21 formed in the friction ring 15; the bore being approximately 0.0005" to 0.0015" smaller than the diameter of the shoulder 20 to provide for a pressed fit engagement therebetween.

The shoulder 20 within the bore 21 has a circumferential groove 22 formed therein, which as seen in FIGS. 2 and 3, is in registration with a groove 23 which chordially intersects the bore 21. A roll pin 24 is pressed into the groove 23 and engages in the groove 22 to lock the blocker pin 17 within the bore 21 and prevent relative movement therebetween.

Pins 19 are likewise locked into bore 25 in ring 16, and it should be noted that the cylindrical shoulder 26 is the same size both within the cylindrical bore 25 and at least for the first increment thereof external of the bore 25. For the blocker pin 17, the cylindrical shoulder 20 is the same diameter both within and out of the bore 21. This non reduction in size at the juncture of the shoulder 20 and the ring 15 and at the juncture of the shoulder 26 and the ring 16 provides for maximum strength of the blocker pins 17 and 19 at this location. This maximum size in cooperation with the roll pin attachment provides for a strong and durable connection between the blocker pins 17 and 19 and the friction rings 15 and 16 respectively.

Although the above description relates to a presently preferred embodiment, numerous modifications may be made without departing from the spirit of the invention as defined in the following claims.

What is claimed is:

1. In a synchronizer assembly, a sychronizer friction ring and blocker pin subassembly characterized in that said blocker pin has a cylindrical shoulder thereon external of said friction ring, said friction ring has a cylindrical bore coaxial with said blocker pin and from about 0.0005" to 0.0015" smaller than said cylindrical shoulder, an extension of said cylindrical shoulder being pressed into said bore, a chordally extending groove in said bore, and a cross pin pressed into said chordally extending groove to lock said blocker pin in said bore.

2. A subassembly according to claim 1 wherein said cylindrical bore and said cylindrical shoulder extension received therein extend for the full axial width of said friction ring.

3. A subassembly according to claim 1 wherein there are at least three blocker pins carried by said ring at circumferentially equal spacing.

4. A sychronizer assembly according to claim 1 wherein said assembly includes a clutch collar spaced axially from said ring, and said clutch collar has an axially extending opening therein receiving a portion of said blocking pin.

5. A sychronizer assembly according to claim 1 wherein said assembly includes a clutch collar spaced axially from said ring, said sub assembly includes three circumferentially equally spaced blocker pins and said clutch collar has three axially extending openings therein, with each opening receiving one of said blocking pins.

6. A subassembly according to claim 1 wherein said shoulder has an annular groove therein disposed in registration with said chordally extending groove and said cross pin is pressed into said registering grooves to lock said blocker pin in said bore.

7. A synchronizing device comprising, first and second axially spaced friction rings, an axially shiftable clutch collar disposed between said friction rings, with said collar having a plurality of circumferentially spaced openings therethrough, a first blocker pin fixed to and extending axially from said first friction ring and passing through one of said spaced openings, a second blocker pin fixed to and extending axially from said second blocker pin fixed to and extending axially from said second friction ring and passing through a second of said spaced openings, said first blocker pin having a cylindrical portion disposed in a first cylindrical bore extending through said first friction ring, said first bore having a cylindrical wall, said first friction ring defining a first groove in such cylindrical wall portion thereof, and a locking pin disposed in said first groove and engageable with said first blocker pin to retain said first blocker pin in said bore.

8. A device according to claim 7 wherein said cylindrical portion of said first blocker pin extending through said first friction ring is the same diameter as the cylindrical portion of said first blocker pin which lies just outside of said friction ring.

9. A device according to claim 7 wherein said first groove extends chordally of said cylindrical bore, said first blocker pin has a second groove formed circumferentially therein and in registration with said first groove, and said locking pin is pressed into said first and second grooves.

10. A device according to claim 7 wherein said first groove extends chordally of said first bore, said first blocker pin has a second groove formed circumferentially therein and in registration with said first groove, and said locking pin is pressed into said first and second grooves.

* * * * *